US010043452B2

(12) United States Patent
Jung et al.

(10) Patent No.: US 10,043,452 B2
(45) Date of Patent: Aug. 7, 2018

(54) ORGANIC LIGHT EMITTING DISPLAY DEVICE

(71) Applicant: Samsung Display Co., Ltd., Yongin-Si, Gyeonggi-Do (KR)

(72) Inventors: Yeon-Shil Jung, Cheonan-si (KR); Hyung-Min Shin, Seoul (KR); Ji-Tae Kim, Seoul (KR); Tae-Wook Kim, Cheonan-si (KR); Sung-Un Park, Suwon-si (KR); Kyung-Ho Hwang, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 173 days.

(21) Appl. No.: 15/236,731

(22) Filed: Aug. 15, 2016

(65) Prior Publication Data

US 2017/0116922 A1 Apr. 27, 2017

(30) Foreign Application Priority Data

Oct. 27, 2015 (KR) ........................ 10-2015-0149415

(51) Int. Cl.
*G06F 3/038* (2013.01)
*G09G 3/3258* (2016.01)

(52) U.S. Cl.
CPC ....... *G09G 3/3258* (2013.01); *G09G 2310/08* (2013.01); *G09G 2330/021* (2013.01)

(58) Field of Classification Search
CPC ........... G09G 3/3258; G09G 2330/021; G09G 2310/08
See application file for complete search history.

(56) References Cited

U.S. PATENT DOCUMENTS

| | | | | |
|---|---|---|---|---|
| 8,269,760 B2 * | 9/2012 | Ogura | G09G 3/3291 | 345/211 |
| 8,279,211 B2 * | 10/2012 | Ogura | G09G 3/3291 | 345/211 |
| 2002/0036636 A1 * | 3/2002 | Yanagi | G09G 3/3696 | 345/211 |
| 2002/0175634 A1 * | 11/2002 | Ishizuka | G09G 3/3216 | 315/169.1 |
| 2004/0041525 A1 * | 3/2004 | Park | G09G 3/3233 | 315/169.3 |
| 2005/0052141 A1 * | 3/2005 | Thielemans | G09G 3/3216 | 315/169.3 |

(Continued)

FOREIGN PATENT DOCUMENTS

| | | |
|---|---|---|
| KR | 1020150014772 A | 2/2015 |
| KR | 1020150114020 A | 10/2015 |

*Primary Examiner* — Rodney Amadiz
(74) *Attorney, Agent, or Firm* — Cantor Colburn LLP

(57) ABSTRACT

An organic light emitting display device includes a display panel, a scan driver, a data driver, a power supply which provides a first voltage to a first power terminal of the pixel and selectively provides the first voltage or a second voltage to a second power terminal of the pixel, and a controller which selects one of a normal driving mode and a power saving mode as a panel driving mode where the power supply provides the second voltage to the second power terminal of the pixel in a first period of one frame period and provides the first voltage to the second power terminal of the pixel in a second period of one frame period when the panel driving mode is the power saving mode.

20 Claims, 8 Drawing Sheets

(56) References Cited

U.S. PATENT DOCUMENTS

| | | | | |
|---|---|---|---|---|
| 2008/0117196 | A1* | 5/2008 | Lee | G09G 3/3225<br>345/208 |
| 2018/0033375 | A1* | 2/2018 | Kang | G09G 3/3258 |

* cited by examiner

ORGANIC LIGHT EMITTING DISPLAY DEVICE

This application claims priority to Korean patent Application No. 10-2015-0149415, filed on Oct. 27, 2015, and all the benefits accruing therefrom under 35 U.S.C. § 119, the content of which in its entirety is herein incorporated by reference.

BACKGROUND

1. Field

Exemplary embodiments of the invention relate to display devices. More particularly, exemplary embodiments of the invention relate to an organic light emitting display device.

2. Description of the Related Art

An organic light emitting display device displays images using organic light emitting diodes ("OLEDs"). The OLED generally includes an organic layer between two electrodes, i.e., an anode and a cathode. Holes from the anode may be combined with electrons from the cathode in the organic layer between the anode and the cathode to emit light.

Recently, the organic light emitting display devices for reducing a power consumption are developed. The organic light emitting display device stores image data in a frame memory, and then drives a display panel with a low frequency, e.g., about 30 Hertz (Hz), using the image data stored in the frame memory during a still image is displayed, for example.

SUMMARY

When reducing the power consumption using the image data, since the frame memory is added to the organic light emitting display device, a power consumption and a manufacturing cost of the organic light emitting display devices may increase.

Exemplary embodiments provide an organic light emitting display device capable of reducing the power consumption and improving the display quality.

According to exemplary embodiments, an organic light emitting display device may include a display panel including a pixel, a scan driver which provides a scan signal to the pixel, a data driver which provides a data signal to the pixel, a power supply which provides a first voltage to a first power terminal of the pixel and selectively provides the first voltage or a second voltage of which voltage level is lower than a voltage level of the first voltage to a second power terminal of the pixel, and a controller which selects one of a normal driving mode and a power saving mode as a panel driving mode and controls the scan driver, the data driver, and the power supply corresponding to the panel driving mode. The power supply may provide the second voltage to the second power terminal of the pixel in a first period of one frame period and provides the first voltage to the second power terminal of the pixel in a second period of one frame period when the panel driving mode is the power saving mode.

In exemplary embodiments, the controller may output a control signal for displaying an image in each of first through (N)th frame periods when the panel driving mode is the normal driving mode, where N is an integer greater than 1. The controller may output the control signal in the first frame period and masks the control signal in the second through (N)th frame periods when the panel driving mode is the power saving mode.

In exemplary embodiments, the data driver may provide the data signal to the pixel in the second period of the first frame period when the panel driving mode is the power saving mode.

In exemplary embodiments, the power supply may decrease a voltage level of the second voltage as a frame period within a unit time increases from the first frame period to the (N)th frame period when the panel driving mode is the power saving mode.

In exemplary embodiments, the power supply may decrease a ratio of a time length of the second period to a time length of the first period as a frame period within a unit time increases from the first frame period to the (N)th frame period when the panel driving mode is the power saving mode.

In exemplary embodiments, the controller may mask at least one selected from a scan start signal and a scan clock signal as the control signal.

In exemplary embodiments, the controller may output image data of an image including a display region and a non-display region when the panel driving mode is the power saving mode.

In exemplary embodiments, a ratio of a time length of the second period to a time length of the first period may be substantially the same as a ratio of a size of the display region to a size of the non-display region.

In exemplary embodiments, the power supply may include a direct current to direct current ("DC-DC") converter which converts an input voltage into the first and second voltages and provides the first voltage to the first power terminal of the pixel, and a voltage selector which receives the first voltage and the second voltage and selectively provides the first voltage or the second voltage to the second power terminal of the pixel.

In exemplary embodiments, the DC-DC converter may generate the second voltage having a predetermined voltage level when the panel driving mode is the normal driving mode.

In exemplary embodiments, the DC-DC converter may generate the second voltage of which a voltage level is periodically changed when the panel driving mode is the power saving mode.

In exemplary embodiments, the DC-DC converter may decrease the voltage level of the second voltage as a frame period within a unit time increases.

In exemplary embodiments, the voltage selector may provide the second voltage to the second power terminal of the pixel when the panel driving mode is the normal driving mode. The voltage selector may selectively provide the first voltage or the second voltage to the second power terminal of the pixel based on a selection signal received from the controller when the panel driving mode is the power saving mode.

According to exemplary embodiments, an organic light emitting display device may include a display panel including a pixel, a scan driver which provides a scan signal to the pixel, a data driver which provides a data signal to the pixel, a power supply which provides a first voltage to a first power terminal of the pixel and selectively provides the first voltage or a second voltage of which voltage level is lower than a voltage level of the first voltage to a second power terminal of the pixel, and a controller which selects one of a normal driving mode and a power saving mode as a panel driving mode and controls the scan driver, the data driver, and the power supply corresponding to the panel driving mode. The data driver may provide the data signal to the pixel while the power supply provides the first voltage to the second power terminal of the pixel when the panel driving mode is the power saving mode.

In exemplary embodiments, the controller may output a control signal for displaying an image in each of first through (N)th frame periods when the panel driving mode is the normal driving mode, where N is an integer greater than 1. The controller may output the control signal in the first frame period and masks the control signal in the second through (N)th frame periods when the panel driving mode is the power saving mode.

In exemplary embodiments, the power supply may provide the first voltage to the second power terminal of the pixel in the first frame period and provides the second voltage to the second power terminal of the pixel in the second through (N)th frame periods when the panel driving mode is the power saving mode. The data driver may provide the data signal to the pixel in at least a portion of the first frame period when the panel driving mode is the power saving mode.

In exemplary embodiments, the power supply may decrease a voltage level of the second voltage as a frame period within a unit time increases from the first frame period to the (N)th frame period when the panel driving mode is the power saving mode.

In exemplary embodiments, the controller may mask at least one selected from a scan start signal and a scan clock signal as the control signal.

In exemplary embodiments, the power supply may include a DC-DC converter which converts an input voltage into the first and second voltages and provides the first voltage to the first power terminal of the pixel, and a voltage selector which receives the first voltage and the second voltage and selectively provides the first voltage or the second voltage to the second power terminal of the pixel.

In exemplary embodiments, the DC-DC converter may generate the second voltage of which a voltage level is periodically changed when the panel driving mode is the power saving mode.

Therefore, an organic light emitting display device according to exemplary embodiments drives the display panel with a low frequency, e.g., about 1 Hertz(Hz), in a power saving mode, thereby reducing the power consumption. In the power saving mode, the organic light emitting display device adjusts a voltage level of a second voltage applied to a cathode electrode of the organic light emitting diode ("OLED") or adjusts a time length in which the second voltage is applied to the pixel to compensate a leakage current of the pixel. Therefore, the organic light emitting display device may consistently maintain a luminance in the power saving mode and improve the display quality.

In addition, the organic light emitting display device may increase the luminance using a coupling effect that occurs by a swing of a power voltage of the pixel and may improve a visibility in a bright location.

BRIEF DESCRIPTION OF THE DRAWINGS

Exemplary embodiments will be described more fully hereinafter with reference to the accompanying drawings, in which.

DETAILED DESCRIPTION

Figure 1:
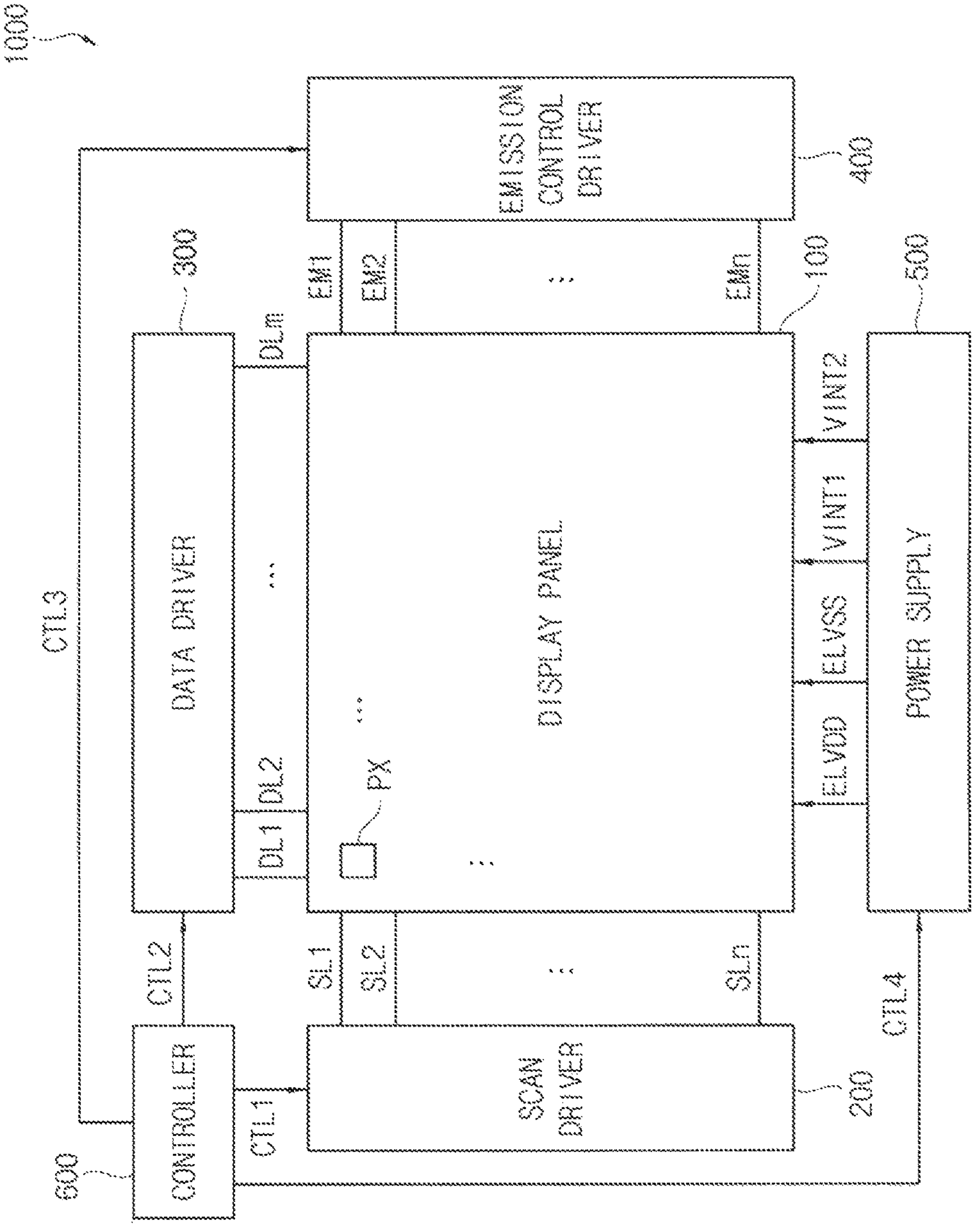
FIG. 1 is a block diagram illustrating exemplary embodiments of an organic light emitting display device according to the invention.

Exemplary embodiments will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). In an exemplary embodiment, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an organic light emitting display device according to exemplary embodiments.

Referring to FIG. 1, an organic light emitting display device 1000 may include a display panel 100, a scan driver 200, a data driver 300, an emission control driver 400, a power supply 500, and a controller 600.

The display panel 100 may include a pixel PX. In an exemplary embodiment, the display panel 100 may include n by m pixels PX because the pixels PX are arranged at locations corresponding to crossing points of the scan lines SL1 through SLn and the data lines DL1 through DLm, for example.

The scan driver 200 may provide a scan signal to the pixel PX via the scan lines SL1 through SLn based on a first control signal CTL1.

The data driver 300 may provide a data signal to the pixel PX via the data lines DL1 through DLm based on a second control signal CTL2. In one exemplary embodiment, the data driver 300 may provide the data signal to the pixel PX while the power supply 500 provides the first power ELVDD (refer to FIG. 2) to the second power terminal of the pixel PX when the panel driving mode is the power saving mode.

The emission control driver 400 may provide an emission control signal to the pixel PX via the emission control lines EM1 through EMn based on a third control signal CTL3.

The power supply 500 may provide voltages such as a first voltage ELVDD, a second voltage ELVSS, a first initialization voltage VINT1, a second initialization voltage VINT2, etc. A voltage level of the second voltage ELVSS may be lower than a voltage level of the first voltage ELVDD. The power supply 500 may provide a first voltage ELVDD to a first power terminal of the pixel PX and selectively provide the first voltage ELVDD or the second voltage ELVSS to a second power terminal of the pixel PX. Here, the second power terminal of the pixel PX may be connected to a cathode electrode of an organic light emitting diode ("OLED").

The power supply 500 may provide the second voltage ELVSS to the second power terminal of the pixel PX when the panel driving mode is the normal driving mode. The power supply 500 may periodically change (i.e., swing) a voltage level of the second power terminal of the pixel PX (i.e., a voltage of the cathode electrode of the OLED) from the voltage level of the first voltage ELVDD to the voltage level of the second voltage ELVSS when the panel driving mode is the power saving mode. In one exemplary embodiment, the power supply 500 may provide the second voltage ELVSS to the second power terminal of the pixel PX in a first period of one frame period and may provide the first power ELVDD source to the second power terminal of the pixel PX in a second period of one frame period when the panel driving mode is the power saving mode. In another exemplary embodiment, the power supply 500 may provide the first voltage ELVDD to the second power terminal of the pixel PX in the first frame period and may provide the second voltage ELVSS to the second power terminal of the pixel PX in second through (N)th frame periods when the panel driving mode is the power saving mode.

The controller 600 may select one of the normal driving mode and the power saving mode as the panel driving mode for driving the display panel 100. The display panel 100 may be driven with a relatively high frequency, e.g., 60 Hertz ("Hz"), in the normal driving mode. The display panel 100 may be driven with a relatively low frequency, e.g., about 1 Hz, in the power saving mode. The controller 600 may improve an efficiency of the organic light emitting display device 1000 by selecting one of the normal driving mode and the power saving mode as the panel driving mode. In one exemplary embodiment, the controller 600 may receive a driving information (e.g., a driving frequency) from external devices, and then may select the panel driving mode based on the driving information. In an exemplary embodiment, when the display device 1000 displays a standby screen image, an application processor ("AP") may provide the driving information corresponding to the power saving mode to the controller 600, for example. The controller 600 may select the power saving mode as the panel driving mode based on the driving information received from the AP. In another exemplary embodiment, the controller 600 may select a panel driving mode based on the image data. In an exemplary embodiment, when the image data corresponds to a still image or a standby screen image, the controller 600 may select the power saving mode as the panel driving mode, for example.

The controller 600 may control the scan driver 200, the data driver 300, the emission control driver 400, and the power supply 500 corresponding to the panel driving mode. In one exemplary embodiment, the controller 600 may output a control signal for displaying the image in each of first through (N)th frame periods during a unit time, e.g., 1 second, when the panel driving mode is the normal driving mode, where N is an integer greater than 1. In contrast, the controller 600 may output the control signal in the first frame period and may mask the control signal in the second through (N)th frame periods when the panel driving mode is the power saving mode.

The controller 600 may drive the display panel 100 with a low frequency, e.g., about 1 Hz, and compensate a leakage current of the pixel PX to consistently maintain a luminance in the power saving mode. In one exemplary embodiment, when the panel driving mode is the power saving mode, the controller 600 may provide a fourth control signal CTL4 including a driving mode information and a frame information to the power supply 500 such that the power supply 500 decreases the voltage level of the second voltage as a frame period within the unit time increases from the first frame period to the (N)th frame period. In another exemplary embodiment, when the panel driving mode is the power saving mode, the controller 600 may provide a fourth control signal CTL4 including a driving mode information and a period information to the power supply 500 such that the power supply 500 decreases a ratio of a time length of the second period in which the first voltage ELVDD is applied to the second power terminal as a frame period within a unit time increases from the first frame period to the (N)th frame period.

Therefore, the organic light emitting display device 1000 may reduce the power consumption by driving the display panel 100 with the low frequency in the power saving mode. The organic light emitting display device 1000 may compensate the leakage current of the pixel PX and consistently maintain the luminance by adjusting the voltage level of the second voltage applied to the cathode electrode of the OLED or adjusting a time length in which the second voltage is applied to the pixel in the power saving mode.

Figure 2:
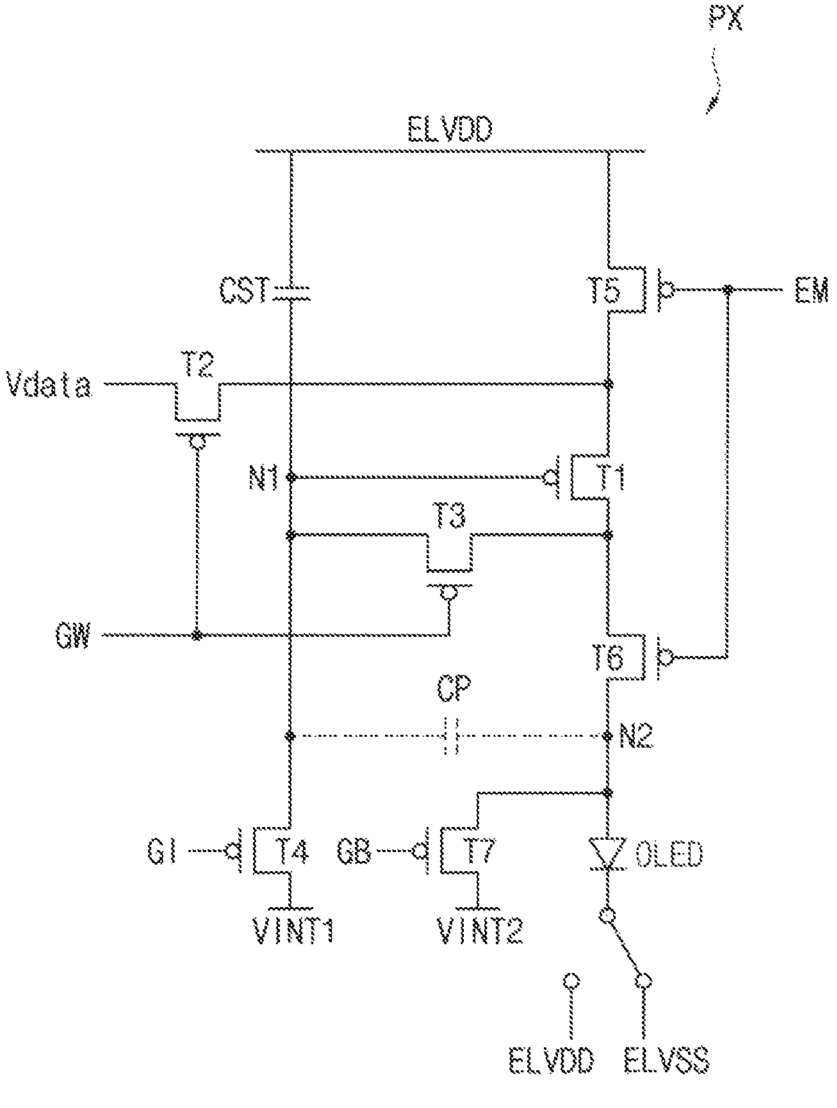
FIG. 2 is a circuit diagram illustrating an exemplary embodiment of a pixel included in an organic light emitting display device of FIG. 1.

FIG. 2 is a circuit diagram illustrating an exemplary embodiment of a pixel included in an organic light emitting display device of FIG. 1.

Referring to FIG. 2, the pixel PX may include a plurality of transistors T1 through T7 and a driving capacitor CST. In an exemplary embodiment, the first transistor T1 may be connected between the first voltage ELVDD and an anode electrode of an OLED and may provide a driving current corresponding to the data signal Vdata to the OLED, for example. The second transistor T2 may be connected between the first electrode of the first transistor T1 and the data line. The third transistor T3 may be connected between the gate electrode and the second electrode of the first transistor T1. The fourth transistor T4 may be connected between a first initialization voltage VINT1 and the gate electrode of the first transistor T1. The fifth transistor T5 may be connected between the first voltage ELVDD and the first electrode of the first transistor T1. The sixth transistor T6 may be connected between the second electrode of the first transistor T1 and the anode electrode of the OLED. The seventh transistor T7 may be connected between a second initialization voltage VINT2 and the anode electrode of the OLED.

Specifically, the fourth transistor T4 may apply the first initialization voltage VINT1 to the driving capacitor CST and the gate electrode of the first transistor T1 in response to a first initialization signal GI to reset the driving capacitor CST and the gate electrode of the first transistor T1 as the first initialization voltage VINT1. The seventh transistor T7 may apply the second initialization voltage VINT2 to the anode electrode of the OLED in response to a second initialization signal GB to reset the anode electrode of the OLED as the second initialization voltage VINT2.

The second transistor T2 may apply the data signal Vdata to the first transistor T1 in response to the scan signal GW.

The third transistor T3 may compensate a threshold voltage of the first transistor T1 in response to the scan signal GW by connecting the gate electrode and the drain electrode of the first transistor T1 (i.e., a diode connection of the first transistor T1). Because the second transistor T2 and the third transistor T3 may receive the scan signal GW, the data signal Vdata may be applied while the threshold voltage of the first transistor T1 is compensated.

The first transistor T1 may provide the driving current corresponding to the data signal Vdata to the OLED.

The sixth transistor T6 may be located between the second electrode of the first transistor T1 and the anode electrode of the OLED. The sixth transistor T6 may control light emission of the OLED in response to an emission control signal EM.

In the power saving mode, the cathode electrode of the OLED may be selectively connected to the first voltage ELVDD or the second voltage ELVSS. The OLED may not emit the light when the first voltage ELVDD is provided to the cathode electrode of the OLED. When a voltage applied to the cathode electrode of the OLED is changed (i.e., swing) from a voltage level of the first voltage ELVDD to a voltage level of the second voltage ELVSS, a parasitic capacitor CP may be formed between a first node N1 connected to the gate electrode of the first transistor T1 and a second node N2 connected to the anode electrode of the OLED, thereby occurring coupling effect. Accordingly, a voltage level of the data signal Vdata decreases, the driving current flowing through the first transistor T1 increases, and a luminance of the display device increases.

Although the exemplary embodiments of FIG. 2 describe that the pixel PX includes the first through seventh transistors T1 through T7 and the driving capacitor CST, the pixel may have various other structures.

Figure 3:
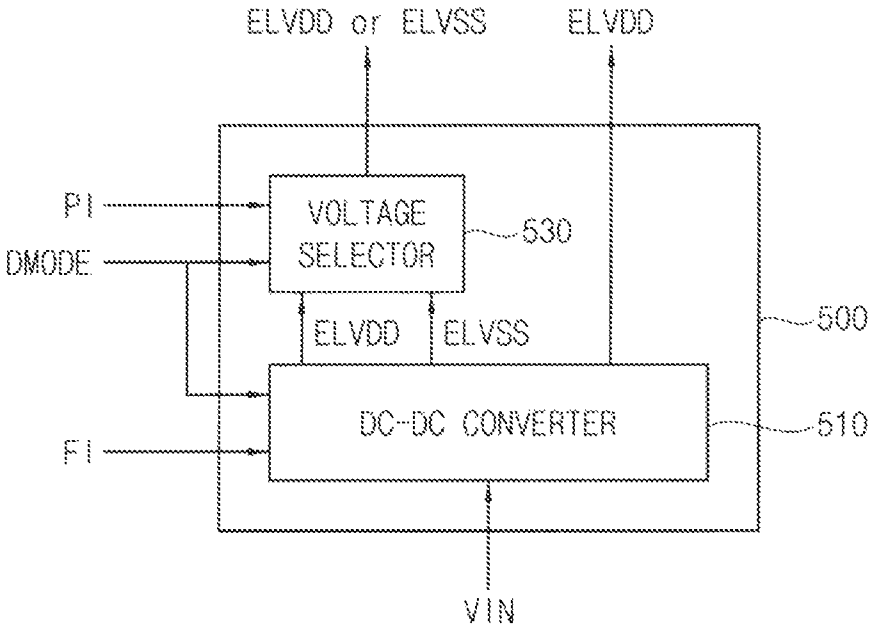
FIG. 3 is a block diagram illustrating an exemplary embodiment of a power supply included in an organic light emitting display device of FIG. 1.

FIG. 3 is a block diagram illustrating an exemplary embodiment of a power supply included in an organic light emitting display device of FIG. 1.

Referring to FIG. 3, the power supply 500 may include a direct current to direct current ("DC-DC") converter 510 and a voltage selector 530.

The DC-DC converter 510 may convert an input voltage VIN into the first and second voltages ELVDD and ELVSS and to provide the first voltage ELVDD to a first power terminal of a pixel.

The DC-DC converter 510 may adjust a voltage level of the second voltage ELVSS in a power saving mode to compensate a leakage current of the pixel and consistently maintain a luminance of the display device. In one exemplary embodiment, the DC-DC converter 510 may receive a frame information FI and a driving mode information DMODE as control signals from the controller. The DC-DC converter 510 may generate the second voltage ELVSS having a predetermined voltage level when the panel driving mode is the normal driving mode. In contrast, the DC-DC converter 510 may generate the second voltage ELVSS of which a voltage level is periodically changed when the panel driving mode is the power saving mode. In an exemplary embodiment, the DC-DC converter 510 may decrease the voltage level of the second voltage ELVSS as a frame period within a unit time included in the frame information FI increases, for example.

The voltage selector 530 may receive the first voltage ELVDD and the second voltage ELVSS from the DC-DC converter 510 and may selectively provide the first voltage ELVDD or the second voltage ELVSS to the second power terminal of the pixel.

The voltage selector 530 may select the first voltage ELVDD or the second voltage ELVSS such that a voltage level of the second power terminal of the pixel (i.e., the cathode electrode of the OLED) is swung from a voltage level of the first voltage ELVDD to a voltage level of the second voltage ELVSS within one frame period or a unit time. In one exemplary embodiment, the voltage selector 530 may receive a period information PI and the driving mode information DMODE from the controller. When the driving mode information DMODE corresponds to the normal driving mode, the voltage selector 530 may provide the second voltage ELVSS to the second power terminal of the pixel. In contrast, when the driving mode information DMODE corresponds to the power saving mode, the voltage selector 530 may selectively provide the first voltage ELVDD or the second voltage ELVSS to the second power terminal of the pixel based on a selection signal or the period information PI.

Figure 4:
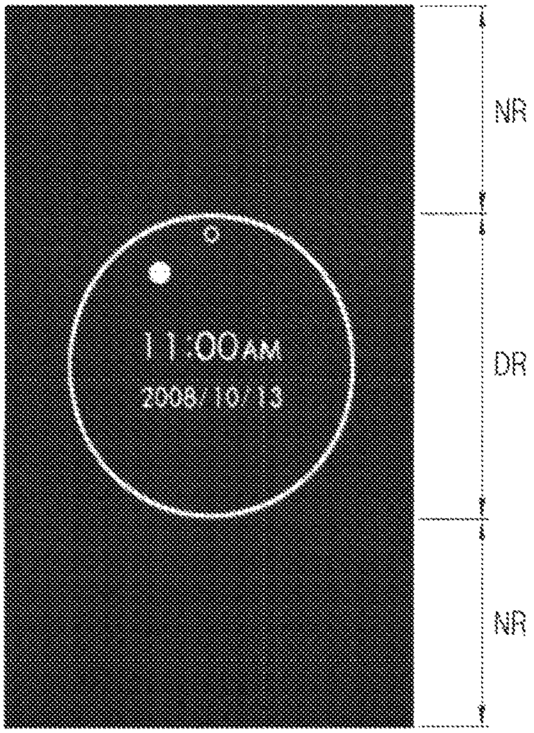
FIG. 4 is a diagram illustrating an exemplary embodiment that an organic light emitting display device of FIG. 1 displays a standby screen image in a power saving mode.
Figure 5:
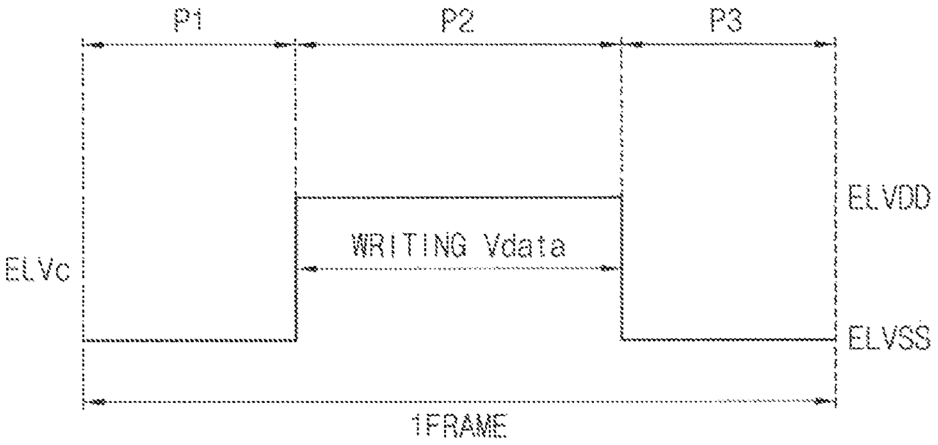
FIG. 5 is a waveform illustrating an exemplary embodiment of a voltage applied to a cathode electrode of an organic light emitting diode ("OLED") during one frame period in a power saving mode.

FIG. 4 is a diagram illustrating an exemplary embodiment that an organic light emitting display device of FIG. 1 displays a standby screen image in a power saving mode. FIG. 5 is a waveform illustrating an exemplary embodiment of a voltage applied to a cathode electrode of an OLED during one frame period in a power saving mode.

Referring to FIGS. 4 and 5, the organic light emitting display device may display the standby screen image corresponding to at least a portion of the display panel in the power saving mode. In an exemplary embodiment, the organic light emitting display device may display the standby screen image for showing the clock, for example. The standby screen image may be a still image and may include a display region DR and a non-display region NR.

As shown in FIG. 5, when the panel driving mode is the power saving mode, a voltage ELVc of the second terminal of the pixel is changed (e.g., swung) from a voltage level of the first voltage ELVDD to a voltage level of the second voltage ELVSS in every frame period. The power supply may provide the second voltage ELVSS to the second power terminal of the pixel in a first period P1/P3 of one frame period and may provide the first voltage ELVDD to the second power terminal of the pixel in a second period P2 of one frame period. The pixel may emit the light in the first period P1/P3 and may not emit the light in the second period P2.

In an exemplary embodiment, the organic light emitting display device may be driven with about 60 Hz frequency in the normal driving mode and may be driven with about 1 Hz frequency in the power saving mode, for example. In the power saving mode, the frame periods of the unit time, e.g., about 1 second, may include the first frame period in which the control signal is provided and the second through sixtieth frame periods in which the control signal is masked. Each of the frame periods, e.g., the first through sixtieth frame periods, may include the first period P1/P3 in which the second voltage ELVSS is provided to the second power terminal and the second period P2 in which the first voltage ELVDD is provided to the second power terminal. Thus, each frame period includes the first period P1/P3 and the second period P2, thereby rising the coupling effect and controlling the light emission time. In one exemplary embodiment, a ratio of a time length of the second period P2 to a time length of the first period P1/P3 may be substantially the same as a ratio of a size of the display region DR to a size of the non-display region NR. In addition, the pixel may be provided the data signal in the second period P2 of the first frame period. Thus, the image data corresponding to the display region DR may be provided to the pixel while the first voltage is provided to the second power terminal of the pixel, thereby preventing a luminance deviation according to a position of the standby screen image.

Figure 6A:
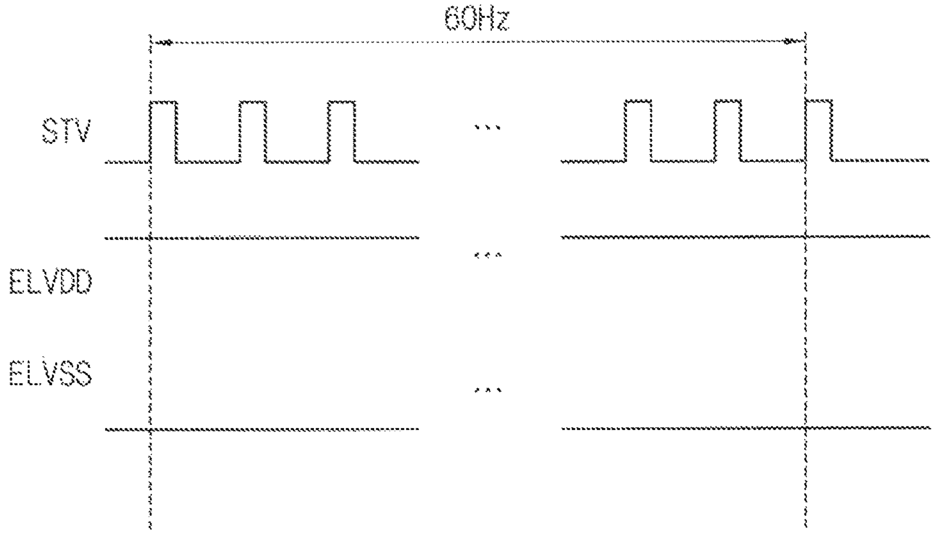
FIG. 6A is a waveform illustrating an exemplary embodiment of a control signal and voltages in a normal driving mode.
Figure 6B:
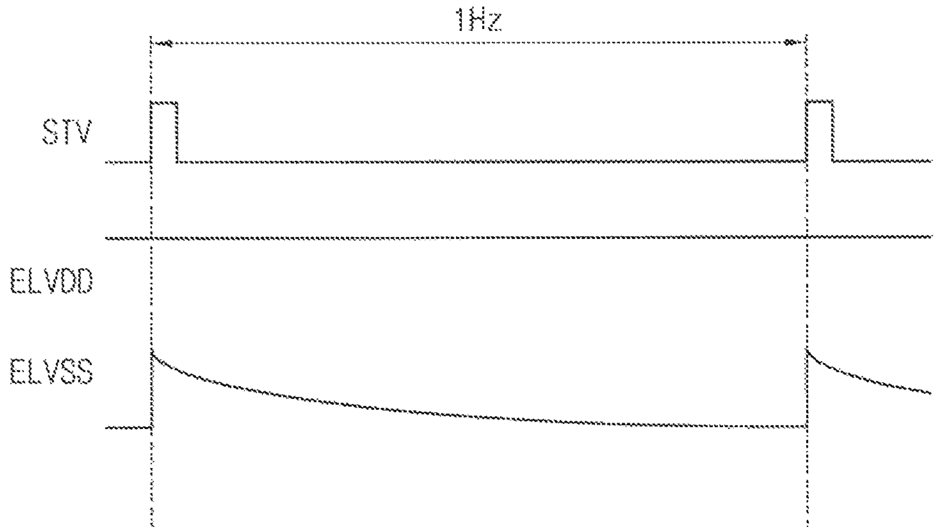
FIG. 6B is a waveform illustrating an exemplary embodiment of a control signal and voltages in a power saving mode.

FIG. 6A is a waveform illustrating an exemplary embodiment of a control signal and voltages in a normal driving mode. FIG. 6B is a waveform illustrating an exemplary embodiment of a control signal and voltages in a power saving mode.

Referring to FIGS. 6A and 6B, the display panel may be driven with a relatively high frequency, e.g., about 60 Hz, in the normal driving mode and may be driven with a relatively low frequency, e.g., about 1 Hz, in the power saving mode.

As shown in FIG. 6A, in the normal driving mode, the controller may provide a control signal for driving the display panel to a panel driver (e.g., a scan driver) in each of first through sixtieth frame periods in order to drive the display panel with about 60 Hz frequency. In an exemplary embodiment, the controller may provide a scan start signal STV and a scan clock signal to the scan driver in each of the first through sixtieth frame periods, for example. The scan driver may progressively output the scan signal to the scan lines in each of the first through sixtieth frame periods. The power supply may provide the first voltage ELVDD to the first power terminal of the pixel and may provide the second voltage ELVSS to the second power terminal of the pixel.

As shown in FIG. 6B, in the power saving mode, the controller may output the control signal in the first frame period and may mask the control signal in the second through sixtieth frame periods in order to drive the display panel with about 1 Hz frequency. In an exemplary embodiment, the controller may provide the scan start signal STV and the scan clock signal to the scan driver in the first frame period, for example. The scan driver may progressively output the scan signal to the scan lines in the first frame period. The controller may mask or block the scan start signal STV and the scan clock signal in the second through sixtieth frame periods not to provide the scan start signal STV to the scan driver. The pixel may emit the light in the second through sixtieth frame periods based on the data signal charged in the first frame period. In this case, to prevent the luminance decrease occurring by the leakage current in the second through sixtieth frame periods, the voltage level of the second voltage ELVSS may decrease as a frame period within a unit time increases from the first frame period to the sixtieth frame period.

Figure 7:
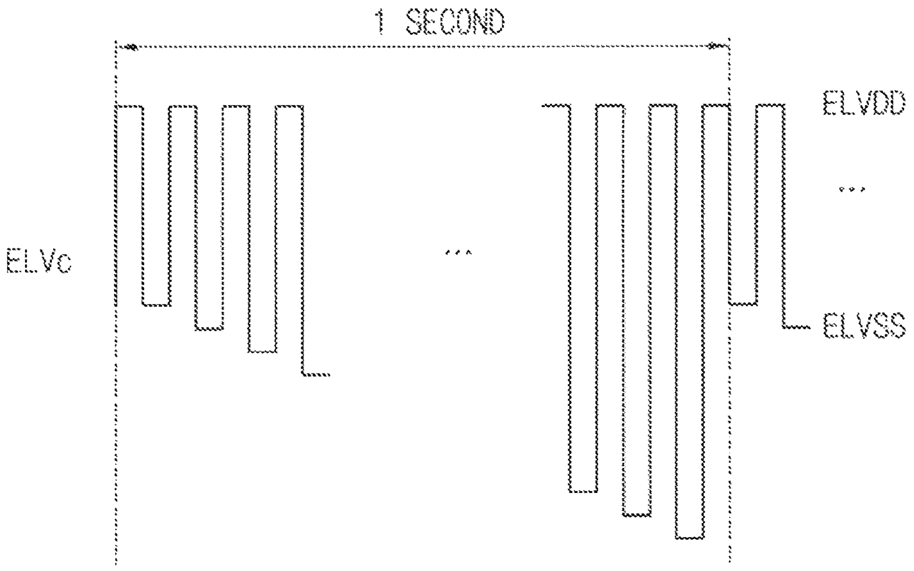
FIG. 7 is a waveform illustrating one exemplary embodiment of a voltage applied to a cathode electrode of an OLED as a frame period within a unit time increases in a power saving mode.

FIG. 7 is a waveform illustrating one exemplary embodiment of a voltage applied to a cathode electrode of an OLED as a frame period within a unit time increases in a power saving mode.

Referring to FIG. 7, in the power saving mode, a voltage ELVc of the second power terminal may be swung from a voltage level of the first voltage ELVDD to a voltage level of the second voltage ELVSS in every frame period in order to raise the coupling effect and control the light emission time. In addition, the voltage level of the second power ELVSS may be adjusted in order to compensate the luminance decrease and consistently maintain the luminance of the display device in spite of low frequency driving, e.g., about 1 Hz driving, in the power save mode. Therefore, the organic light emitting display device may drive the display panel with the low frequency without the luminance deviation and may reduce the power consumption in the power saving mode.

In an experimental example, a 5.7 inch test panel in which white color corresponds to 370 candelas. For the test panel, the voltage ELVc of the second power terminal of the pixel was swung from the voltage level of the first voltage ELVDD to the voltage level of the second voltage ELVSS in every frame period. A luminance of the test panel increased about 1.54 times because of the coupling effect. Also, for the test panel, a ratio of a period in which the second voltage ELVSS is provided to the second power terminal in every frame period was set to about 70 percent (%). Accordingly, when the test panel displayed the white color, the luminance was about 398 candelas (i.e., 370×0.7×1.54=398 candelas).

Figure 8:
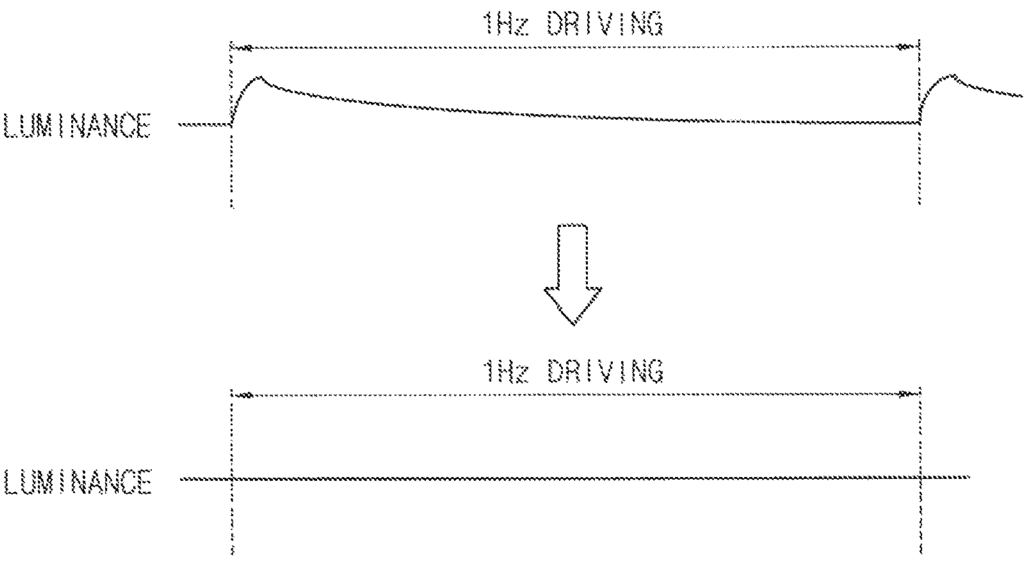
FIG. 8 is a diagram for describing an effect of a luminance compensation.

FIG. 8 is a diagram for describing an effect of a luminance compensation.

Referring to FIG. 8, in the power saving mode, when the display panel is driven with low frequency, e.g., about 1 Hz, by masking a control signal, a luminance of a display device may decrease due to a leakage current in masked frame periods. Thus, the luminance of a display device may gradually decrease as a frame period within a unit time increases. Specifically, when a ratio of masked frame periods to non-masked frame periods in which the control signal is provided is relatively high, the display quality may remarkably decrease because flicker phenomenon occurs by the leakage current.

Therefore, the organic light emitting display device may compensate the luminance decrease and consistently maintain the luminance by decreasing the voltage level of the second voltage as the number of masked frame periods increase within the unit time.

Figure 9:
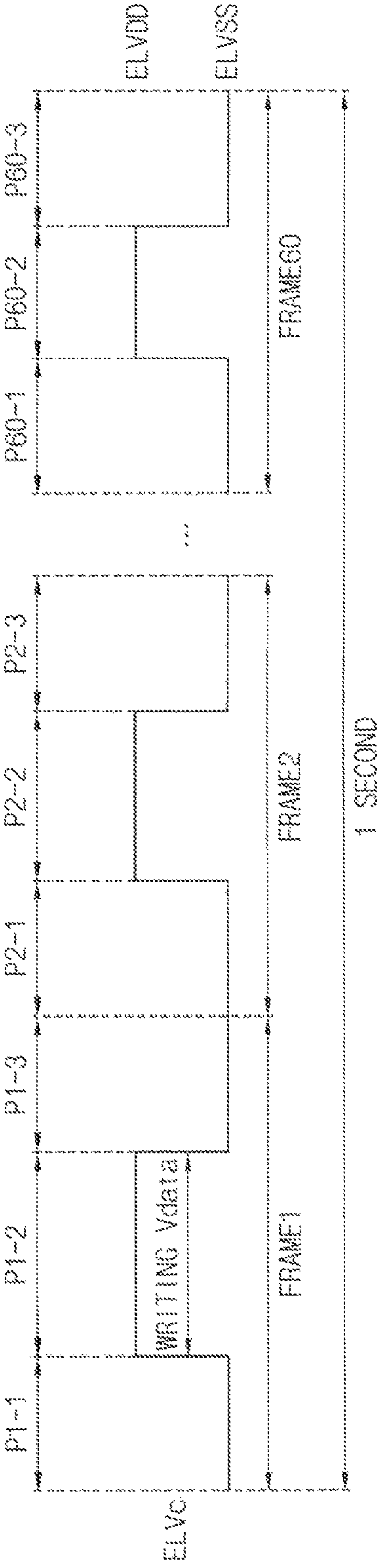
FIG. 9 is a waveform illustrating another exemplary embodiment of a voltage applied to a cathode electrode of an OLED as a frame period within a unit time increases in a power saving mode.

FIG. 9 is a waveform illustrating another exemplary embodiment of a voltage applied to a cathode electrode of an OLED as a frame period within a unit time increases in a power saving mode.

Referring to FIG. 9, a voltage ELVc of the second power terminal of the pixel may be swung from a voltage level of the first voltage ELVDD to a voltage level of the second voltage ELVSS in every frame period. In addition, the organic light emitting display device may control a light emission time to compensate the luminance decrease occurring by the leakage current in masked frame periods. Thus, the time length in which the first voltage ELVDD is provided to the second power terminal during one frame period may be adjusted.

In an exemplary embodiment, in the first frame period in which the control signal is applied, image data of a display region may be applied to the pixel in a (1-2)nd period P1-2 in which the first voltage ELVDD is provided to the second voltage terminal of the pixel, for example. In the second through sixtieth frame periods in which the control signal is masked, time length of periods (i.e., P2-2, P3-2, . . . , P60-2) in which the first voltage ELVDD is provided to the second power terminal may gradually decrease as a frame period within the unit time increases. In other words, a ratio of a time length of the second period in which the first voltage ELVDD is provided to the second power terminal to a time length of the first period in which the second voltage ELVSS is provided to the second power terminal may decrease as the frame period within the unit time increases from the first frame period to the sixtieth frame period.

Therefore, the organic light emitting display device according to exemplary embodiments of FIG. 9 may compensate the luminance decrease and improve the display quality by adjusting the time length in which the first voltage ELVDD or the second voltage ELVSS are provided to the second power terminal within one frame period when the panel driving mode is the power saving mode (i.e., low frequency driving mode).

Figure 10:
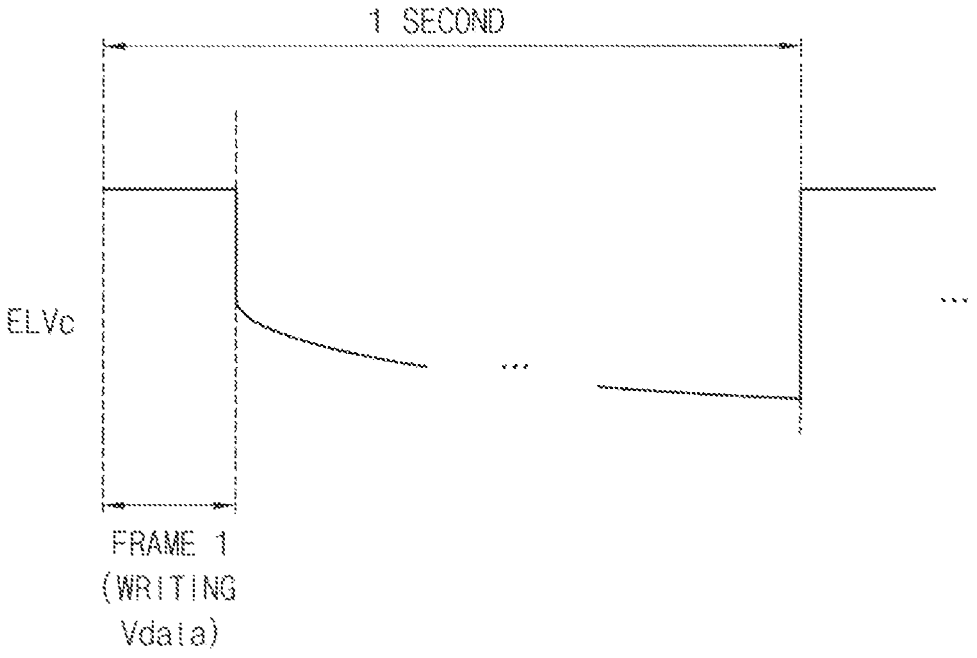
FIG. 10 is a waveform illustrating still another exemplary embodiment of a voltage applied to a cathode electrode of an OLED as a frame period within a unit time increases in a power saving mode.

FIG. 10 is a waveform illustrating still another exemplary embodiment of a voltage applied to a cathode electrode of an OLED as a frame period within a unit time increases in a power saving mode.

Referring to FIG. 10, a voltage ELVc of the second power terminal of the pixel may be swung from a voltage level of the first voltage ELVDD to a voltage level of the second voltage ELVSS between the first frame period and the second frame period. In addition, in the power saving mode, the data signal may be applied to the pixel while the first voltage is provided to the second power terminal of the pixel. The second voltage may be provided to the second power terminal of the pixel in the frame periods in which the control signal is masked, and then the voltage level of the second voltage ELVSS may decrease as a frame period within a unit time increases.

In an exemplary embodiment, when the panel driving mode is the power saving mode, the first voltage ELVDD is provided to the second power terminal of the pixel in the first frame period, and the pixel may not emit the light, for example. The data signal may be applied to the pixel in at least a portion of the first frame period. A voltage applied to the second power terminal of the pixel may be swung from a voltage level of the first voltage ELVDD to a voltage level of the second voltage ELVSS in the second frame period. The control signal may be masked and the second voltage ELVSS may be provided to the second power terminal of the pixel in the second through sixtieth frame periods. A voltage level of the second voltage ELVSS may decrease as the period passes in the second through sixtieth frame periods.

In the organic light emitting display device according to exemplary embodiments of FIG. 10, a luminance may increase about 1.5 times because of the coupling effect because a voltage applied to the second power terminal of the pixel is swung between the first frame period and the second frame period. Further, because the voltage level of the second voltage ELVSS is adjusted, the luminance that increases by the coupling effect may be consistently maintained during masked frame periods. Therefore, the organic light emitting display device may be driven as a high brightness mode in which the display device has a high luminance and with about 1 Hz driving mode. Therefore, the organic light emitting display device may improve the visibility in a bright location. Also, in the organic light emitting display device, the voltage level of the second voltage ELVSS may be changed in a relatively wide range because the luminance increases due to the coupling effect.

Although the exemplary embodiments describe that the display panel is driven with about 1 Hz frequency in the power saving mode, the driving frequency of the power saving mode is not limited thereto.

The invention may be applied to an electronic device having the organic light emitting display device. In an exemplary embodiment, the invention may be applied to a cellular phone, a smart phone, a smart pad, a personal digital assistant ("PDA"), etc., for example.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An organic light emitting display device comprising:

a display panel including a pixel;

a scan driver which provides a scan signal to the pixel;

a data driver which provides a data signal to the pixel;

a power supply which provides a first voltage to a first power terminal of the pixel and to selectively provide the first voltage or a second voltage of which a voltage level is lower than a voltage level of the first voltage to a second power terminal of the pixel; and a controller which selects one of a normal driving mode and a power saving mode as a panel driving mode and controls the scan driver, the data driver, and the power supply corresponding to the panel driving mode, wherein the power supply provides the second voltage to the second power terminal of the pixel in a first period of one frame period and provides the first voltage to the second power terminal of the pixel in a second period of one frame period when the panel driving mode is the power saving mode.

2. The display device of claim 1, wherein the controller outputs a control signal for displaying an image in each of first through (N)th frame periods when the panel driving mode is the normal driving mode, where N is an integer greater than 1, and wherein the controller outputs the control signal in the first frame period and masks the control signal in the second through (N)th frame periods when the panel driving mode is the power saving mode.

3. The display device of claim 2, wherein the data driver provides the data signal to the pixel in the second period of the first frame period when the panel driving mode is the power saving mode.

4. The display device of claim 2, wherein the power supply decreases the voltage level of the second voltage as a frame period within a unit time increases from the first frame period to the (N)th frame period when the panel driving mode is the power saving mode.

5. The display device of claim 2, wherein the power supply decreases a ratio of a time length of the second period to a time length of the first period as a frame period within a unit time increases from the first frame period to the (N)th frame period when the panel driving mode is the power saving mode.

6. The display device of claim 2, wherein the controller masks at least one selected from a scan start signal and a scan clock signal as the control signal.

7. The display device of claim 1, wherein the controller outputs image data of an image including a display region and a non-display region when the panel driving mode is the power saving mode.

8. The display device of claim 7, wherein a ratio of a time length of the second period to a time length of the first period is substantially the same as a ratio of a size of the display region to a size of the non-display region.

9. The display device of claim 1, wherein the power supply includes:

a direct current to direct current converter which converts an input voltage into the first and second voltages and provides the first voltage to the first power terminal of the pixel; and a voltage selector which receives the first voltage and the second voltage and selectively provides the first voltage or the second voltage to the second power terminal of the pixel.

10. The display device of claim 9, wherein the direct current to direct current converter generates the second voltage having a predetermined voltage level when the panel driving mode is the normal driving mode.

11. The display device of claim 9, wherein the direct current to direct current converter generates the second voltage of which a voltage level is periodically changed when the panel driving mode is the power saving mode.

12. The display device of claim 11, wherein the direct current to direct current converter decreases the voltage level of the second voltage as a frame period within a unit time increases.

13. The display device of claim 9, wherein the voltage selector provides the second voltage to the second power terminal of the pixel when the panel driving mode is the normal driving mode, and wherein the voltage selector selectively provides the first voltage or the second voltage to the second power terminal of the pixel based on a selection signal received from the controller when the panel driving mode is the power saving mode.

14. An organic light emitting display device comprising:

a display panel including a pixel;

a scan driver which provides a scan signal to the pixel;

a data driver which provides a data signal to the pixel;

a power supply which provides a first voltage to a first power terminal of the pixel and selectively provides the first voltage or a second voltage of which a voltage level is lower than a voltage level of the first voltage to a second power terminal of the pixel; and a controller which selects one of a normal driving mode and a power saving mode as a panel driving mode and controls the scan driver, the data driver, and the power supply corresponding to the panel driving mode, wherein the data driver provides the data signal to the pixel while the power supply provides the first voltage to the second power terminal of the pixel when the panel driving mode is the power saving mode.

15. The display device of claim 14, wherein the controller outputs a control signal for displaying an image in each of first through (N)th frame periods when the panel driving mode is the normal driving mode, where N is an integer greater than 1, and wherein the controller outputs the control signal in the first frame period and masks the control signal in the second through (N)th frame periods when the panel driving mode is the power saving mode.

16. The display device of claim 15, wherein the power supply provides the first voltage to the second power terminal of the pixel in the first frame period and provides the second voltage to the second power terminal of the pixel in the second through (N)th frame periods when the panel driving mode is the power saving mode, and wherein the data driver provides the data signal to the pixel in at least a portion of the first frame period when the panel driving mode is the power saving mode.

17. The display device of claim 15, wherein the power supply decreases the voltage level of the second voltage as a frame period within a unit time increases from the first frame period to the (N)th frame period when the panel driving mode is the power saving mode.

18. The display device of claim 15, wherein the controller masks at least one selected from a scan start signal and a scan clock signal as the control signal.

19. The display device of claim 14, wherein the power supply includes:

a direct current to direct current converter which converts an input voltage into the first and second voltages and provides the first voltage to the first power terminal of the pixel; and a voltage selector which receives the first voltage and the second voltage and selectively provides the first voltage or the second voltage to the second power terminal of the pixel.

20. The display device of claim 19, wherein the direct current to direct current converter generates the second voltage of which the voltage level is periodically changed when the panel driving mode is the power saving mode.

* * * * *